(12) United States Patent
Imm

(10) Patent No.: US 7,913,452 B1
(45) Date of Patent: Mar. 29, 2011

(54) PLANT POT ARRANGEMENT

(76) Inventor: Edward J. Imm, Cincinnati, OH (US)

( * ) Notice: Subject to any disclaimer, the term of this patent is extended or adjusted under 35 U.S.C. 154(b) by 26 days.

(21) Appl. No.: 12/571,488

(22) Filed: Oct. 1, 2009

Related U.S. Application Data

(63) Continuation-in-part of application No. 11/380,313, filed on Apr. 26, 2006, now Pat. No. 7,617,632.

(51) Int. Cl.
*A01G 9/02* (2006.01)
*A47G 7/00* (2006.01)

(52) U.S. Cl. .................... 47/83; 47/39; 47/79

(58) Field of Classification Search .......... 47/83, 82, 47/79, 39, 41.14, 67, 65.5, 65, 17, 62 R
See application file for complete search history.

(56) References Cited

U.S. PATENT DOCUMENTS

| | | | |
|---|---|---|---|
| 217,010 | A | 7/1879 | Judson et al. |
| 419,484 | A | 1/1890 | Wayland |
| 1,396,445 | A | 11/1921 | Loudon |
| 1,451,515 | A | 4/1923 | Niemczewski |
| 1,485,852 | A | 3/1924 | Jarvis |
| 2,241,463 | A | 5/1941 | Keller |
| 2,746,208 | A | 5/1956 | Lewis |
| 3,030,735 | A | 4/1962 | Bodkins |
| 3,108,401 | A | 10/1963 | Ione |
| 3,262,665 | A | 7/1966 | Black |
| 3,554,473 | A | 1/1971 | Rakov et al. |
| 3,675,783 | A | 7/1972 | Reese |
| 4,006,559 | A | 2/1977 | Carolyn, Jr. |
| 4,125,965 | A | 11/1978 | Schweim |
| 4,250,666 | A | 2/1981 | Rakestraw |
| 4,584,792 | A | 4/1986 | Etzel |
| 4,736,543 | A | 4/1988 | von Bertrab Erdmann |
| 4,747,494 | A | 5/1988 | Tyson |
| 5,199,213 | A | 4/1993 | Krebs et al. |
| D338,116 | S | 8/1993 | Gallagher |
| 5,279,072 | A | 1/1994 | Garbo |
| 5,438,797 | A * | 8/1995 | Lendel ............................. 47/82 |
| 5,450,692 | A | 9/1995 | Ruibal |
| 5,487,476 | A | 1/1996 | Barfield |
| 5,502,922 | A | 4/1996 | Shiomo |
| 5,598,662 | A | 2/1997 | Droste |
| 5,934,014 | A | 8/1999 | Carrothers |
| 5,967,359 | A | 10/1999 | Mindell |
| 6,029,937 | A | 2/2000 | Funaro |
| D453,883 | S * | 2/2002 | Conde ......................... D6/455 |
| 6,425,555 | B1 | 7/2002 | Hedeman |
| 6,442,895 | B1 | 9/2002 | Van Roey |

(Continued)

FOREIGN PATENT DOCUMENTS

FR 2644338 3/1989

*Primary Examiner* — Rob Swiatek
*Assistant Examiner* — Kristen C Hayes
(74) *Attorney, Agent, or Firm* — Wood, Herron & Evans, LLP

(57) ABSTRACT

A plant stand positioning plant pots in a cascading arrangement. The plant stand includes a pole, a first brace, and a second brace. The pole has a lumen and a plurality of perforations there through. The first brace and the second brace each have an aperture to allow the braces to be slid over the pole and the braces are then received inside of the base plant pot. Multiple plant pots can then be stacked over the pole in an alternating arrangement. Water is delivered to the plants in the pots by flowing through the lumen and out the perforations in the pole.

20 Claims, 9 Drawing Sheets

U.S. PATENT DOCUMENTS

| | | |
|---|---|---|
| 6,470,625 B1 | 10/2002 | Byun |
| 6,557,297 B2 | 5/2003 | Receveur |
| 6,557,806 B2 | 5/2003 | Davies |
| 6,612,073 B1 | 9/2003 | Powell et al. |
| 6,840,008 B1 | 1/2005 | Bullock et al. |
| 6,895,713 B2 | 5/2005 | Warren |
| 6,983,561 B2 | 1/2006 | Warren |
| 7,055,282 B2 | 6/2006 | Bryan, III |
| 7,802,399 B2 * | 9/2010 | Shelton et al. ............ 47/39 |
| 2005/0034363 A1 * | 2/2005 | Warren ............... 47/39 |
| 2005/0132644 A1 | 6/2005 | Schreiber |
| 2005/0166449 A1 | 8/2005 | Warren |
| 2005/0262768 A1 | 12/2005 | Cybula |
| 2009/0000189 A1 | 1/2009 | Black |

* cited by examiner

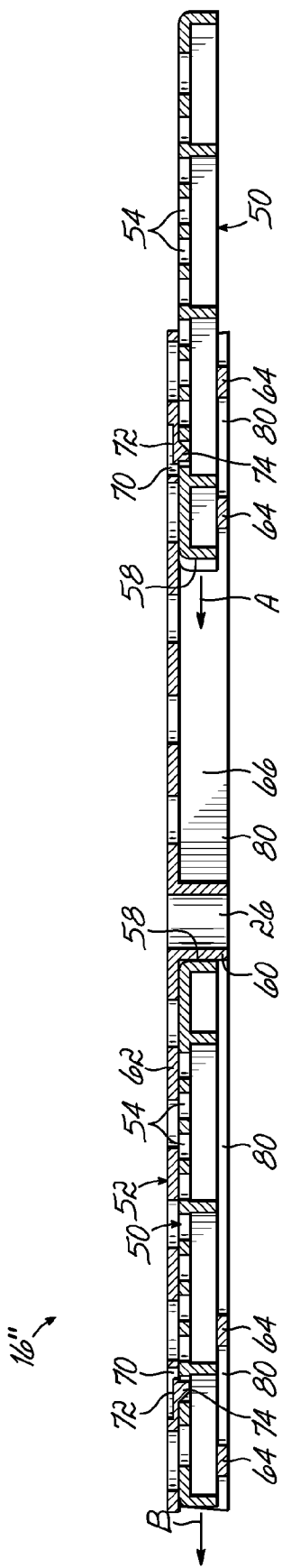
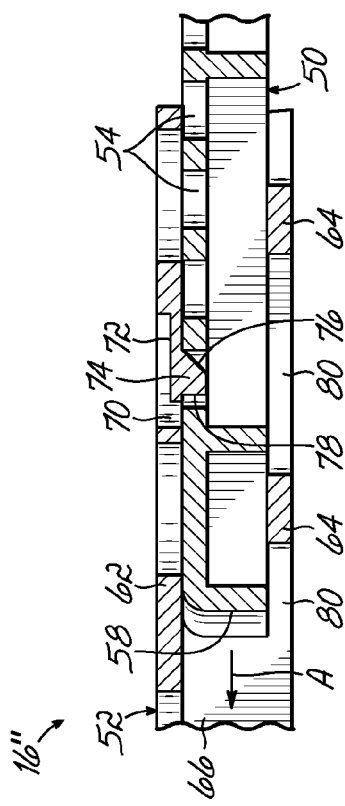
FIG. 11
FIG. 12

PLANT POT ARRANGEMENT

This is a continuation-in-part of U.S. patent application Ser. No. 11/380,313, now U.S. Pat. No. 7,617,632 filed Apr. 26, 2006 and hereby incorporated by reference in its entirety.

TECHNICAL FIELD OF THE INVENTION

This invention relates to the growing and caring of decorative plants, particularly, but not exclusively, to a plant stand that allows plant pots to be maintained in a cascading type arrangement.

BACKGROUND OF THE INVENTION

The arranging of flowering and other plants dates back for eons. Many people have flowering plants in their gardens, offices, homes and in other places to provide color, fragrance and other pleasing sensory effects. Flowering and decorative plants can be arranged in many different types of arrangements. For example, in some arrangements, a shelf is provided where plant pot holding flowering plants can be stacked at different levels of height to provide different color contrasts and other visual pleasing affects. Other types of arrangements have multiple hanging plants or stackable plants. One particularly attractive type of arrangement is a cascading arrangement. Commonly, this is achieved by placing a pole, rod, or other supporting device into a plant pot and sliding plant pots onto that rod through their drain hole enabling the plant pots to be positioned at an angle to the pole. This arrangement is very aesthetically pleasing because the flowers and plants angle to different sides enabling the gardener to view all the different plants at once.

Drawbacks do exist with the cascading type arrangement. For instance, many cascading arrangements are somewhat unstable subjecting the plant pot to possible damage or rattling. In addition, watering of the cascading plants can be time consuming. The watering can must be moved from pot to pot at a variety of angles to ensure that the soil is made sufficiently damp. In addition, many cascading plant pot arrangements require that the pole be inserted all the way into the ground beneath the pots to support the cascading plant stand. Such a design prevents the cascading plant arrangement from being placed inside of a home or on a concrete or other rigid surface.

SUMMARY OF THE INVENTION

The above described and other shortcomings with prior plant stand arrangements have been overcome with this invention. One aspect of this invention is a plant stand. The plant stand includes a base plant pot having an interior space defined therein, at least one side wall, and a bottom with a drain hole. A pole with a central lumen there through includes a plurality of perforations. The pole is inserted into the interior space of the base plant pot and into the drain hole in the base. A first brace has a first length. The first brace is mounted on the pole and is received inside of the interior space of the base plant pot. A second brace having a second length is mounted on the pole and is received inside of the interior space of the base pot. The braces contact the side wall of the base plant pot to stabilize the plant stand. The lumen and perforations in the pole are in fluid communication with the interior space of the base pot to provide watering access to a plant and soil contained in the base pot.

Another aspect of the invention is a plant stand. The plant stand includes a base pot defining an interior space, a side surface, and a bottom with a drain hole. A pole is inserted into the interior space of the base pot and aligned with the drain hole. The first brace has a first length and is positioned on the pole in the interior space of the base pot and engages the side surface of the base pot. The second brace has a second length positioned on the pole in the interior space of the base pot and engages the side surface of the base pot. Each of the braces contacts the side surface of the base pot to stabilize the plant stand. In addition, at least one upper pot has a side and a base defining a drain hole there through. The upper pot is mounted on the base pot with the pole extending through the drain hole of the upper pot. The base of the upper pot rests on one of the braces in the interior space of the base pot.

Yet another aspect of the invention is a kit for erecting a plant stand arrangement with a base pot and at least one upper pot. The kit includes a pole adapted to be inserted into the base pot that extends generally vertically upwardly. First and second braces are each adapted to be mounted to the pole in spaced relation to each other. The first and second braces also each contact an interior surface of the base pot. One of the braces is adapted to support the upper pot when the upper pot is mounted on the pole.

BRIEF DESCRIPTION OF THE DRAWINGS

The above-mentioned and other features and advantages of this invention, and the manner of attaining them, will become more apparent and the invention itself will be better understood by reference to the following description of embodiments of the invention taken in conjunction with the accompanying drawings, wherein:

FIGS. 9-12 are cross-sectional views of the braces being adjusted.

DETAILED DESCRIPTION OF THE ILLUSTRATED DRAWINGS

Figure 1:
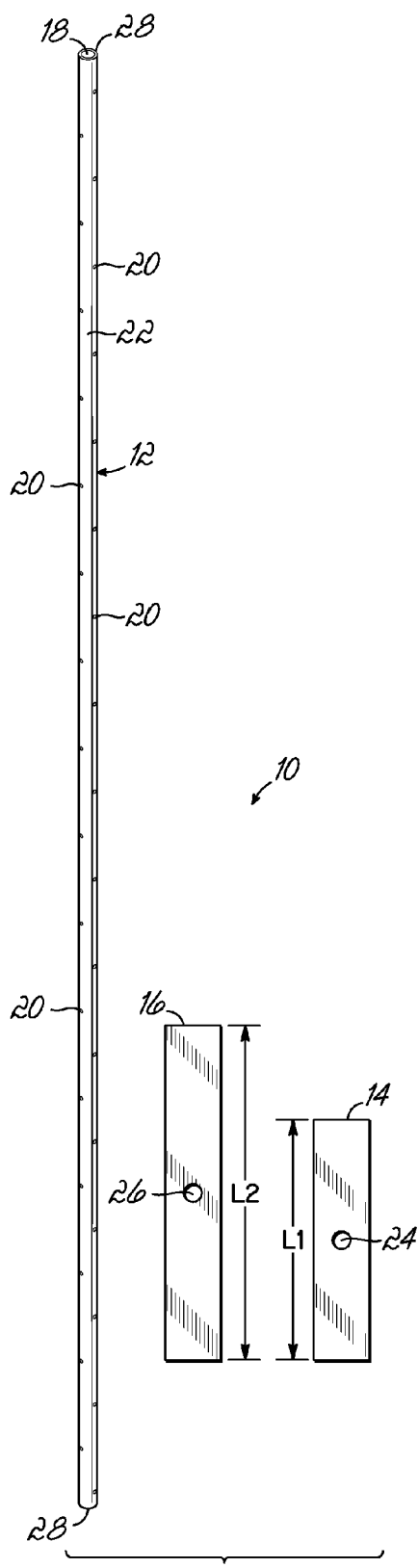
FIG. 1 illustrates a side elevational view of a plant stand according to one embodiment of this invention.

Referring now to FIG. 1, a plant stand 10 according to one embodiment of this invention includes a pole 12 used in combination with a first brace 14 having a first length L1 and a second brace 16 having a second length L2 to form the plant stand 10. The pole 12 includes a lumen 18 longitudinally there through connected to a plurality of perforations 20 along the outer periphery 22 of the pole 12. Fluid can travel through the lumen 18 and out of the perforations 20. The first brace 14 and the second brace 16 each have a first aperture 24 and a second aperture 26, respectively, therethrough. The first aperture 24 and the second aperture 26 are each of a diameter that is slightly larger than the cross-sectional diameter of the pole 12. Accordingly, the pole 12 with spaced ends 28, 28 can be inserted through the apertures 24, 26 of the first brace 14 and the second brace 16. Forming the pole 12 and first and second brace 14, 16 out of resilient materials is advantageous since the forces applied to the pole 12, the first brace 14, and the second brace 16 are significant.

Figure 2:
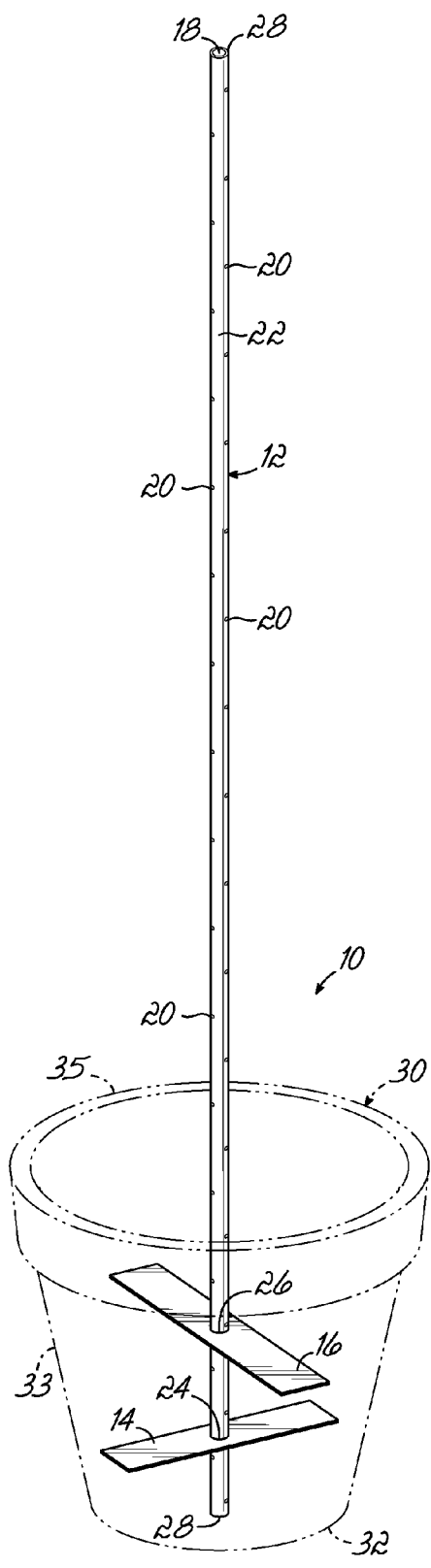
FIG. 2 illustrates the assembled plant stand of FIG. 1 inserted into a base plant pot illustrated in phantom lines.

Referring now to FIG. 2, the plant stand 10 of FIG. 1 has been inserted into a base plant pot 30 that is illustrated in phantom lines. The pole 12 of the plant stand 10 may not extend outside of the base plant pot 30 or may rest even with a bottom 32 of the base plant pot 30. Alternatively, the lowermost end 28 of the pole 12 may rest on the ground supporting the pot 30 or a tray, plate or the like (not shown) under the pot 30. The base plant pot 30 includes at least one sidewall 33 that extends upwardly from the bottom 32 at an angle so that the diameter of the base plant pot 30 is smaller adjacent the bottom 32 then adjacent to the upper rim 35 of the base plant pot 30. The first brace 14 is placed closer to the bottom 32 of the base plant pot 30 to better conform to the smaller diameter of the base plant pot 30 in that region. Conversely, the longer second brace 16 is placed a little bit higher up on the pole 12. The second brace 16 extends across a slightly larger diameter section of the base plant pot 30. The base plant pot 30 generally tapers from a larger diameter to a smaller diameter at the bottom. The first brace 14 and second brace 16 therefore provide rigid support for the pole 12. The braces 14, 16, prevent lateral or radial movement of the pole 12. Those skilled in the art will also note that the first and second braces 14, 16 easily slide up and down along the pole 12 until the correct location inside of the base plant pot 30 is determined by physical contact with the sidewall 33.

Figure 3:
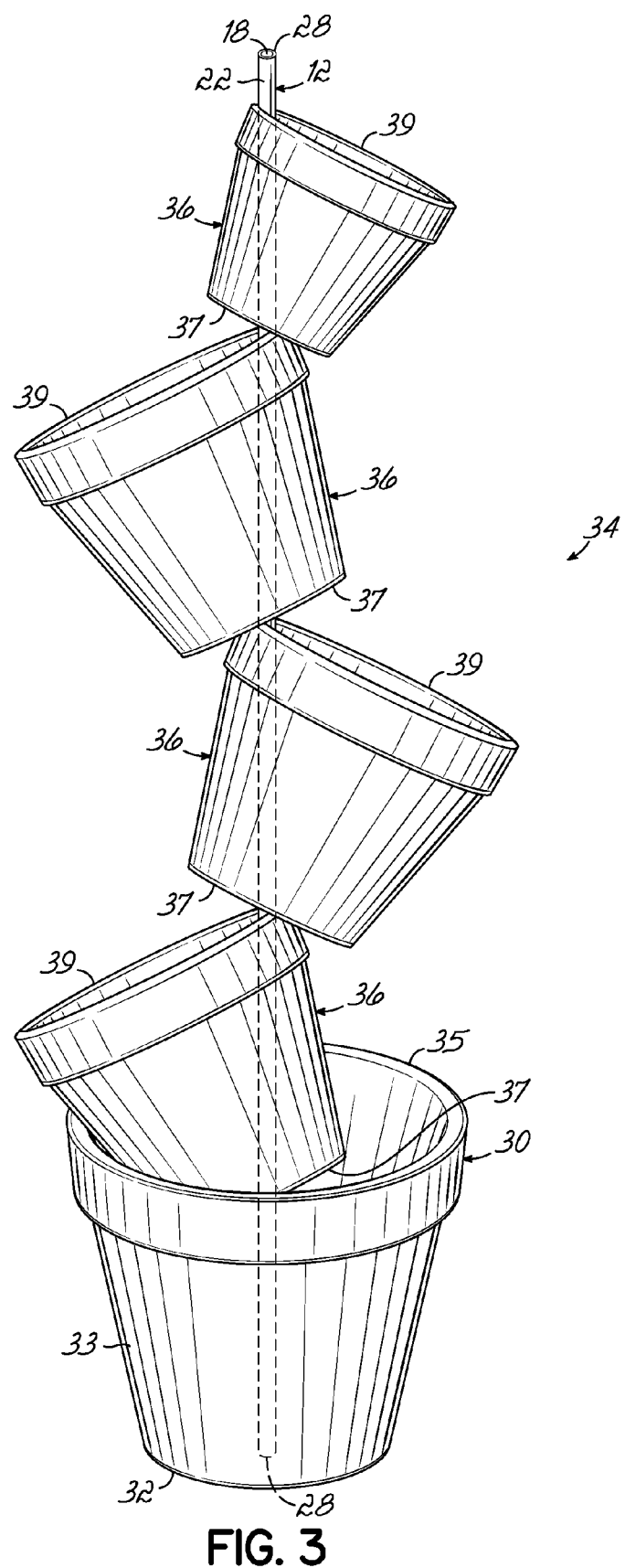
FIG. 3 illustrates a perspective view of a plant pot arrangement obtained using the plant stand illustrated in FIG. 1.

Referring now to FIG. 3, a plant pot arrangement 34 is illustrated. The plant pot arrangement 34 includes a plurality of plant pots 36 that are inserted over the pole 12. The plant pots 36 each include a drain hole (not shown) in the respective plant pot bottom 37 to allow the plant pots 36 to slide over the pole 12. As FIG. 3 illustrates, the plant pots 36 are positioned on the pole 12 in an alternating arrangement. Each of the plant pots 36 rests on top of the upper rim 39, 35 of the plant pots 36 immediately below it and exerts a force against the pole 12 to maintain this angled, alternating configuration. In most embodiments, the plant pots 36 are generally heavy and formed from ceramic materials. However, the pots 30, 36 utilized with this invention may be formed of any material in any configuration.

Once the plant pot arrangement 34 is obtained, then soil (not shown) can be added into all the plant pots 36 for the plants. Alternatively, the pots 30, 36 could already be filled with soil prior to placing the pots 30, 36 over the pole 12.

Figure 4:
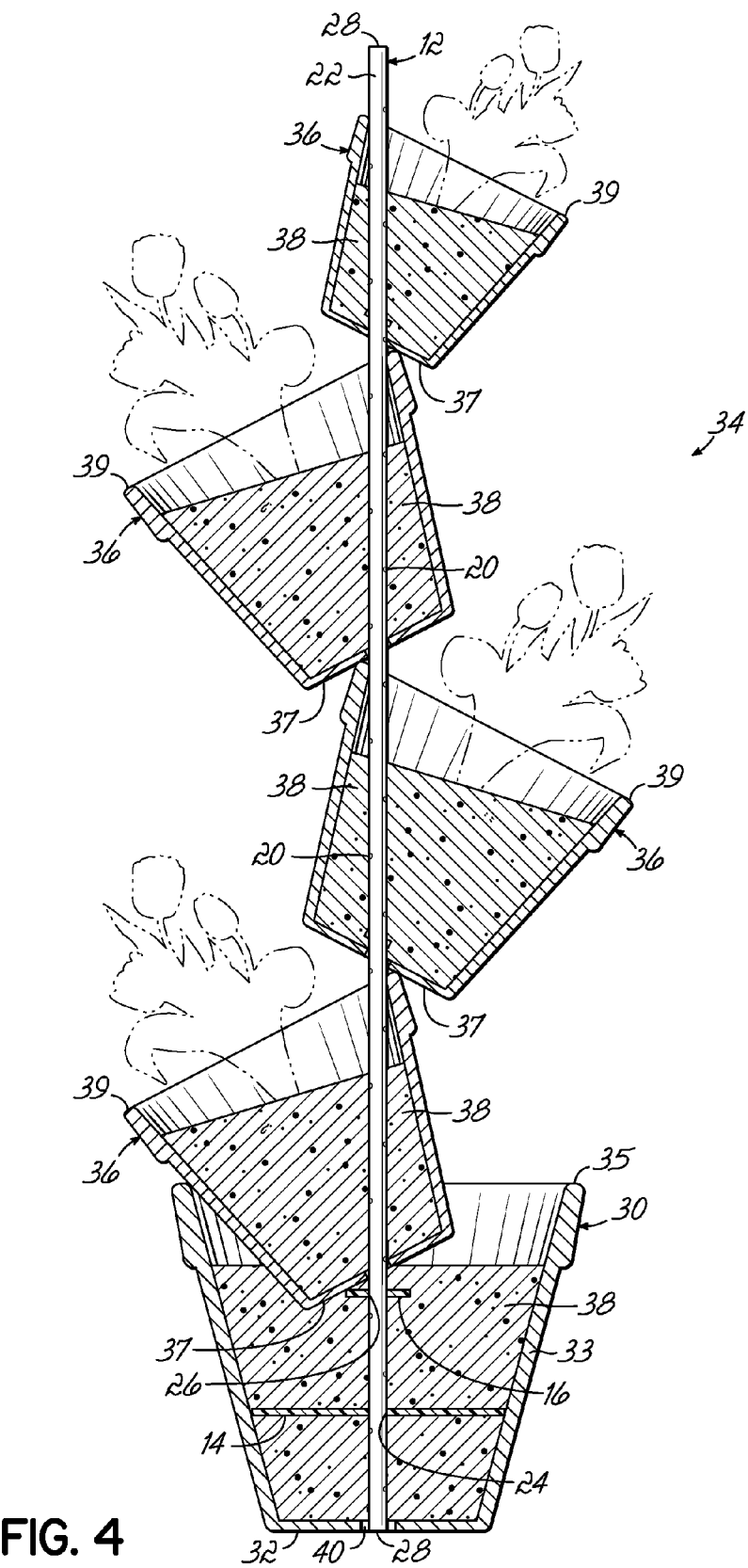
FIG. 4 illustrates a partial cross-sectional view of the plant pot arrangement illustrated in FIG. 3.

Referring now to FIG. 4, soil 38 is placed inside of the plant pots 36 and the base plant pot 30. The base plant pot 30 has the bottom 32 to contain the soil 38 and a drain hole 40 to allow excess fluid, such as water, to flow out of the base plant pot 30. The pole 12 can support the plant pots 36 without extending outside of the base plant pot 30 drain hole 40 thereby allowing the plant pot arrangement 34 to be placed upon interior floors or rigid ground. Support is provided by the first brace 14 and the second brace 16 contacting the side 33 of the base plant pot 30. In addition, the second brace 16 increases support by contacting the side 33 of the base plant pot 30 at a larger diameter and assumes a spatial orientation of the second brace 16 orthogonal to the first brace 14. In addition, the bottom 37 of the one of the plant pots 36 most proximal to the base plant pot 30 rests upon the second brace 16 and the rim 30 of the base plant pot 30. This design allows for increased stability in the plant pot arrangement 34 and helps to prevent rattling and/or damage to the pots 30, 36.

Figure 5:
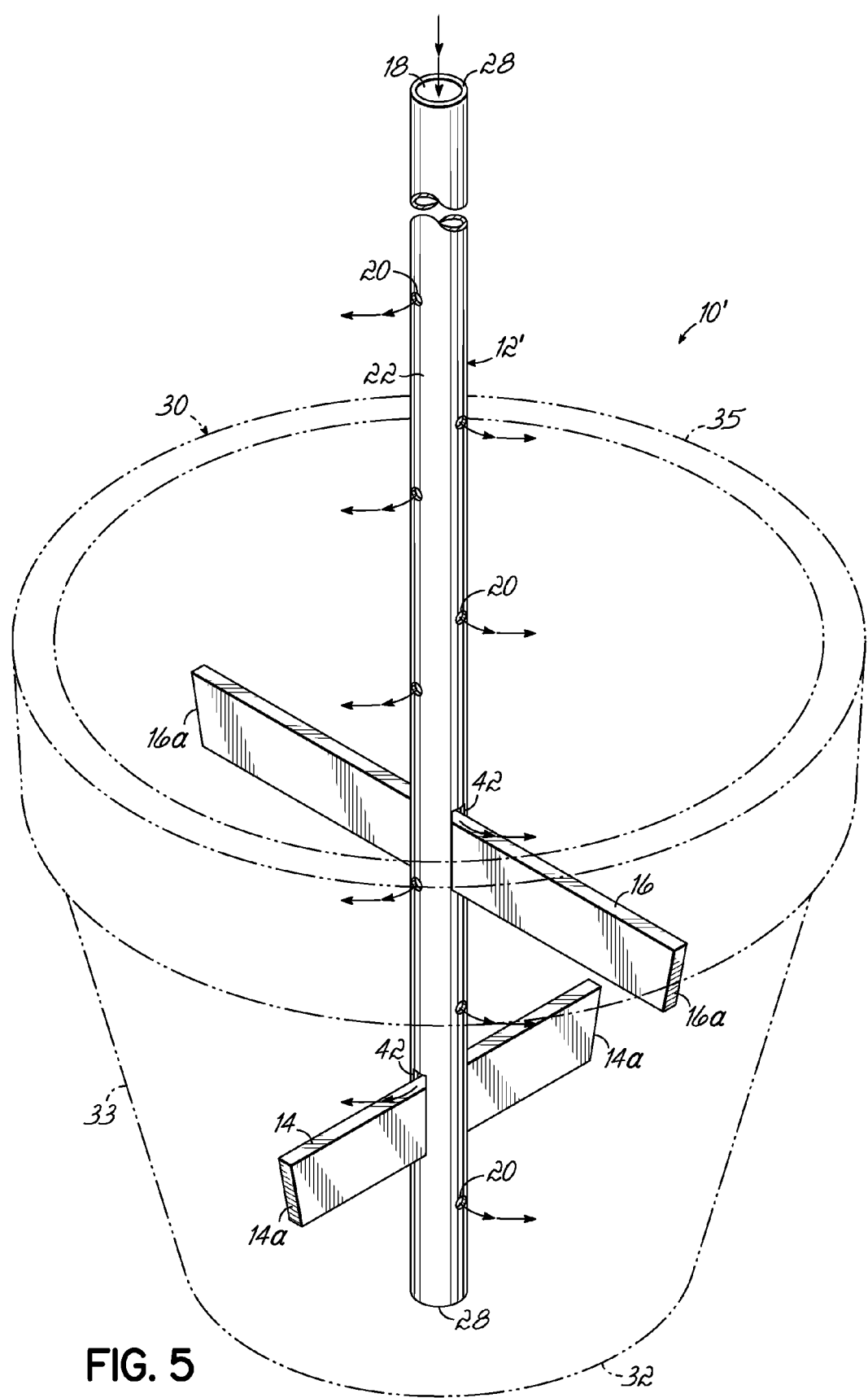
FIG. 5 illustrates an alternate embodiment of a plant stand wherein the plant stand includes a pole with slots defined therein to allow the supporting braces to be inserted through the pole.
Figure 6:
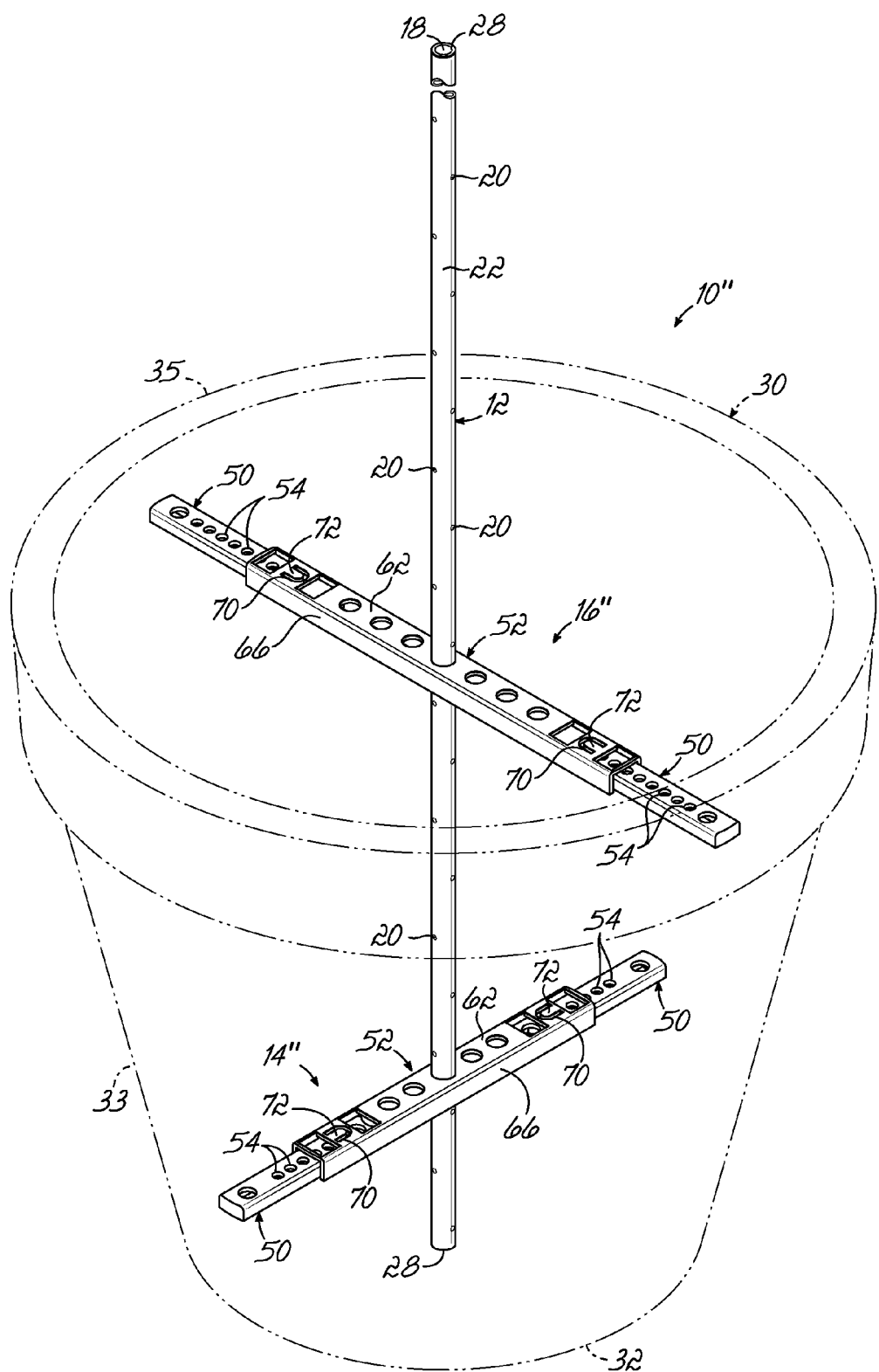
FIG. 6 illustrates a further alternate embodiment of a plant stand according to this invention wherein the plant stand includes a pole inserted through apertures in adjustable braces to allow the braces to be used with a variety of base pot sizes.

Referring now to FIG. 5, an alternative form of the plant stand 10' is shown. Identical reference numerals are used to identify identical parts already described above and the parts that are different are indicated with an (') symbol, with the differences being readily ascertainable. The plant stand 10' includes a pole 12' that has slots 42 defined therethrough. Accordingly, the first brace 14 and the second brace 16 are not passed over the ends 28 of the pole 12, but are inserted through the slots 42. This design further increases stability since the vertical orientation of the braces 14, 16 create a stable I-beam-like cross section. In addition, FIG. 5 also illustrates how the pole 12 having the lumen 18 waters the plants in the plant pot arrangement 34 simultaneously. Water enters the lumen 18 from a source, such as a hose, watering can or the like via the open upper end 28 of the pole 12, and passes down through lumen 18 out the perforations 20 where it is spread to the pots 30, 36 positioned along the pole 12 in the plant pot arrangement 34. In addition, it also provides fluid to the base plant pot 30. One of ordinary skill will readily determine the appropriate quantity of water to use when watering the plants in the pots 30, 36 in this manner. A plug (not shown) may be inserted into the lowermost end 28 of the pole 12 or the lowermost end 28 may rest on the ground or other surface to inhibit the escape of water from the lowermost pole end 28. The longitudinal ends 14a, 16a of the braces 14, 16 as shown in the embodiment of FIG. 5 may be tapered or sloped to correspond to the taper or slope of the base plant pot 30 sidewall 33 and provide a stable, secure support from the pole 12 and plant pots 36.

Referring now to FIGS. 6-12, an alternative form of the plant stand 10" is shown. Identical reference numerals are used to identify identical parts already described above and the parts that are different are indicated with an (") symbol, with the differences being readily ascertainable. The plant stand 10" includes a pole 12. The first and second braces 14" and 16" are each adjustable in length in this embodiment and include apertures 24 and 26, respectively. Accordingly, the first brace 14" and the second brace 16" are passed over the ends 28 of the pole 12 to be positioned in the base pot 30.

Figure 7:
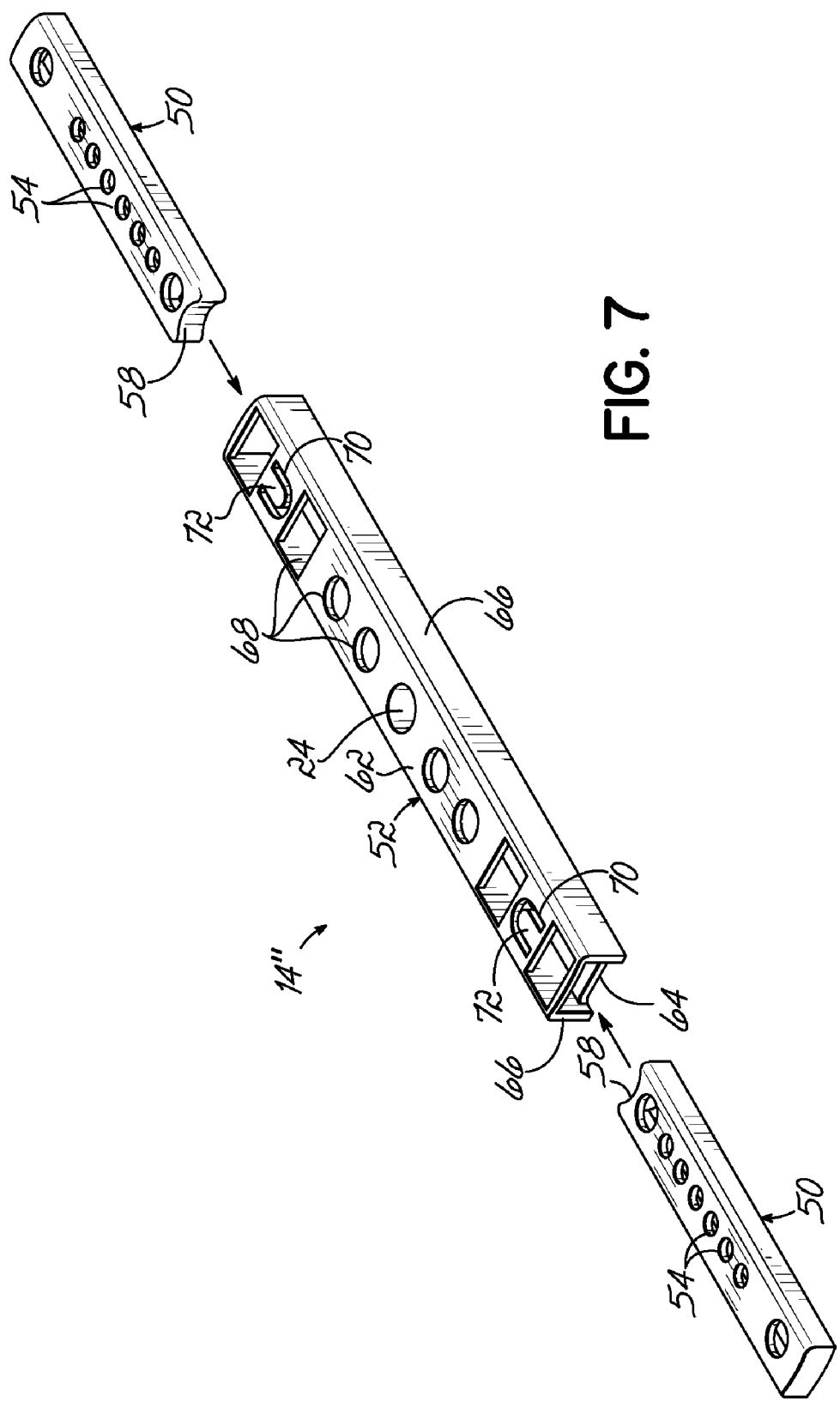
FIG. 7 is a perspective exploded view of one of the braces of the embodiment shown in FIG. 6.
Figure 8:
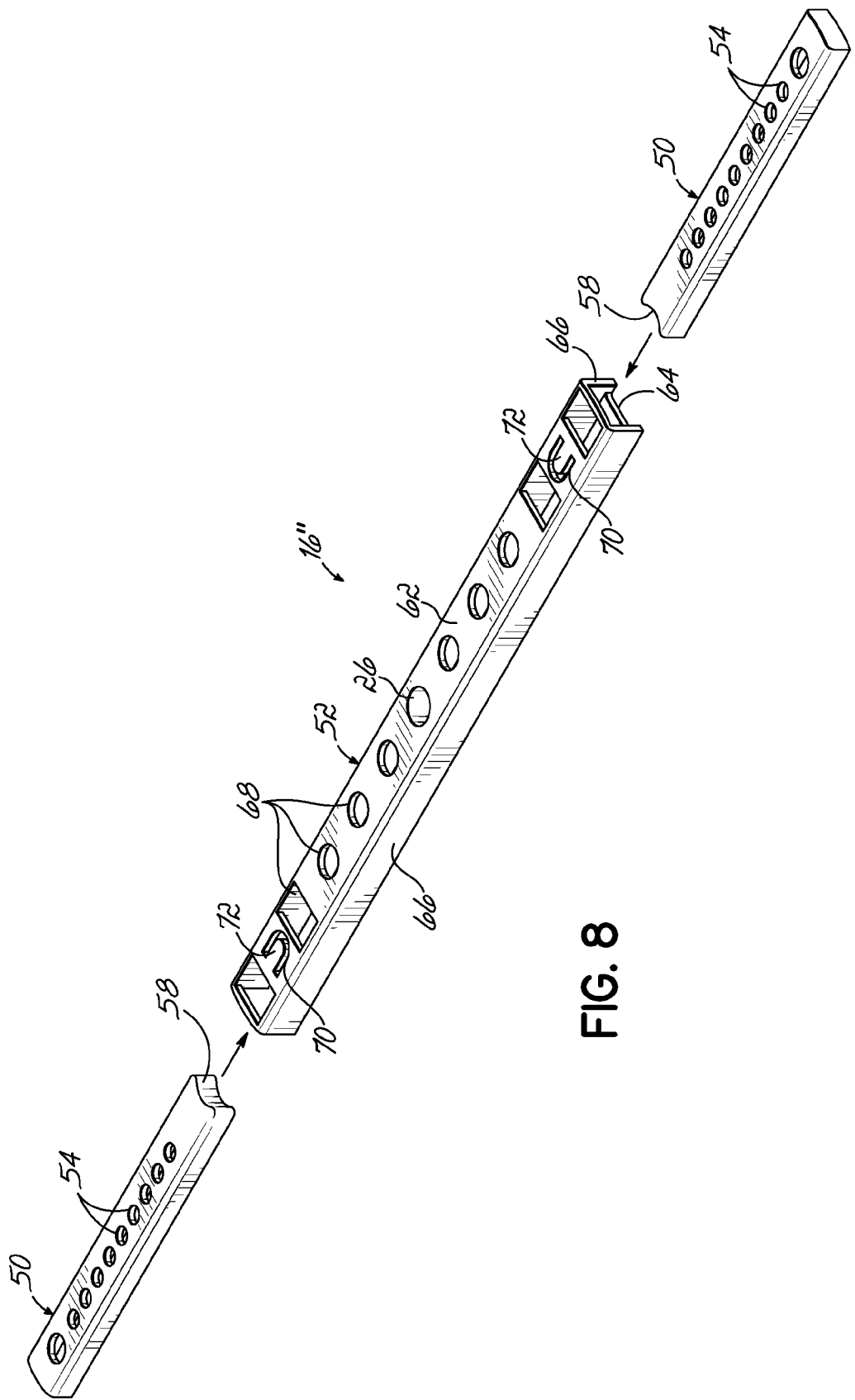
FIG. 8 is a view similar to FIG. 7 of another one of the adjustable braces.
Figure 9:
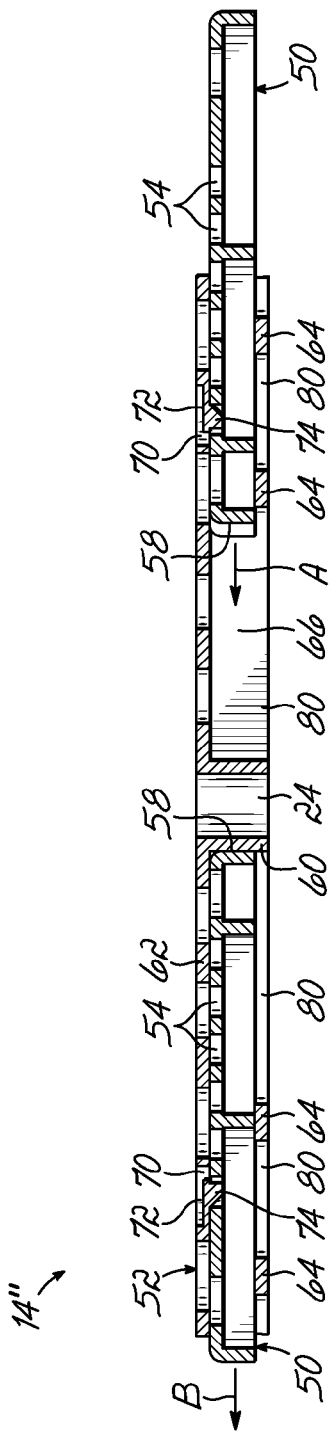
Figure 10:
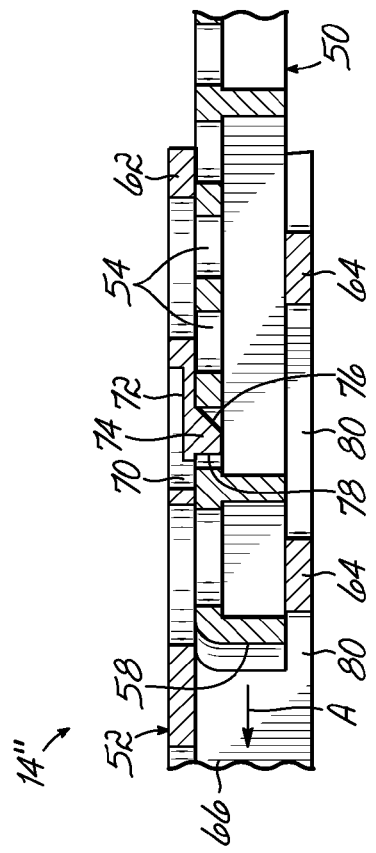

Advantageously, the braces 14", 16" are each adjustable in length so that the braces and associated plant stand 10" can be utilized with a variety of different base pot 30 configurations and sizes. Specifically, embodiments of the adjustable braces 14", 16" are shown in FIGS. 7 and 8, respectively, and each include a pair of extensions 50 each projecting outwardly from one of the longitudinal ends of a brace member 52 in the form of a sleeve. As such, each of the extensions 50 may be adjusted in a telescopic manner relative to the associated brace member 52 so as to adjust the overall length of the brace 14", 16". Each of the extensions 50 includes a series of spaced sockets 54 formed on an upper face of the extension 50 and arranged linearly in a longitudinal direction of the extension 50. A contoured end 58 is formed on each extension 50 which is compatible with the shape of an aperture sidewall 60 so that when the extension 50 is mated with the brace member 52, the extension 50 may be inserted telescopically into the brace member 52 to mate with the sidewall 60 forming the aperture 24, 26 as shown in FIGS. 9 and 11.

The brace member 52 of each brace 14", 16" includes upper and lower walls 62, 64 spaced apart and joined together by a pair of lateral sidewalls 66, 66. The walls 62, 64, 66 of the brace member 52 combine to form a sleeve configuration to telescopically receive the extensions 50 on opposite ends of the brace member 52 as shown in FIGS. 7 and 8. As previously mentioned, the aperture 24, 26 is formed in the middle of the brace member 52 to receive the pole 12 there through. The aperture 24, 26 is formed by the sidewall 60 extending between the upper and lower walls 62, 64 of the brace member 52 as shown in FIGS. 9-12. The brace member 52 may include a number of holes, apertures or voids 68 in a variety of shapes to minimize the weight of the member 52 and allow for the flow of water, moisture and soil, as appropriate.

Each brace member 52 also includes a pair of U-shaped slots 70 formed around a tab 72 cantilevered in the upper wall 62 of the brace member 52. Projecting downwardly from a bottom face of each cantilevered tab 72 is a button 74 as shown in FIGS. 9-12. Each button 74 includes a tapered edge 76 oriented outwardly in a longitudinal direction on the brace member 52. The button 74 projects below the lower surface of the upper wall 62 and is sized and configured to seat within each of the sockets 54 on the extension 50 as shown in FIGS. 9-12. The opposite edge 78 of each button 74 is not tapered. The tapered edge 76 allows the user to push the extension 50 inwardly in the direction of arrow A in FIGS. 9-12 so as to collapse the extension 50 into the brace member 52 and shorten the overall length of the brace 14", 16" more easily. The lower wall 64 of the brace member 52 includes a number of openings 80 through which the user may insert a finger or other probe (not shown) to force the button 74 upwardly to release the button from the sockets 54 and allow the extension 50 to be pulled outwardly from the brace member 52 as shown by arrow B in FIGS. 9-12.

Advantageously, the design of the adjustable braces 14", 16" according to this embodiment of the invention allows for the length of the brace to be adjusted for compatibility with a variety of sizes and shapes of pots so that the plant stand 10" can be utilized in a variety of environments. Additionally, while the extensions 50 will typically be equally spaced relative to the pole 12 and associated brace member 52, this is not a requirement of this embodiment of the adjustable braces 14", 16". In other words, one extension 50 on each brace 14", 16" may be longitudinally positioned further or closer to the central aperture 24, 26 than the opposite extension 50 as may be appropriate for a particular installation and environment. The longitudinal ends 14a, 16a of the braces 14", 16" as shown in the embodiment of FIGS. 6-12 may be contoured to correspond to the shape of the base plant pot 30 sidewall 33 and provide a stable, secure support for the pole 12 and plant pots 36.

While this invention has been illustrated by the description of embodiments thereof, and while the embodiments have been described in considerable detail, it is not intended to restrict or in any way limit the scope of the appended claims to such detail. Additional advantages and modifications will readily appear to those skilled in the art. The invention in its broader aspects is, therefore, not limited to the specific details, representative apparatus and method, and illustrative examples shown and described. Accordingly, departures may be made from such details without departing from the spirit or scope of the general inventive concept.

What is claimed is:

1. A plant stand comprising:
a base pot having an interior space defined therein, the base pot having a side wall, an upper rim and a bottom;
a pole inserted into the interior space of the base pot;
a first brace mounted on the pole and received inside of the interior space of the base pot; and
a second brace mounted on the pole and received inside of the interior space of the base pot;
wherein said braces each contact the side wall of the base pot to stabilize the plant stand;
wherein a length of at least one of the braces is adjustable;
a plurality of pots each having a side wall, a bottom and a hole in said bottom, and wherein the pole projects through the bottom hole in each of the pots;
wherein each of the pots is supported on an upper rim of the pot immediately subjacent thereto and the pots are positioned in an alternating configuration about the pole;
wherein the pot immediately superjacent to the base pot is supported on one of the braces in the interior space of the base pot.

2. The plant stand of claim 1 wherein a side wall of the immediately superjacent pot is stabilized by the upper rim of the base pot.

3. The plant stand of claim 1, wherein said first brace and said second brace are positioned orthogonal to and spaced from one another when received inside the interior space of the base pot.

4. The plant stand of claim 1, wherein the first and second brace are each adjustable in length.

5. The plant stand of claim 1, wherein the pole further comprises:
a longitudinal lumen in the pole; and
a plurality of perforations in the pole, each perforation being in communication with the lumen to disperse fluid in the lumen into the pots when positioned on the pole.

6. The plant stand of claim 1 wherein the at least one adjustable brace further comprises:
at least one extension adjustably coupled to a longitudinal end of a brace member.

7. The plant stand of claim 6 wherein the extension is telescopically coupled to the brace member.

8. The plant stand of claim 7 further comprising:
a button on one of the brace member and the extension; and
a plurality of sockets on the other one of the brace member and the extension;
wherein the button is selectively received in one of the sockets to adjustably couple the extension to the brace member.

9. The plant stand of claim 1 wherein the pole is positioned equal distances from each longitudinal end of each brace.

10. A plant stand comprising:
a base pot having an interior space defined therein, the base pot having a side wall, an upper rim and a bottom, wherein said bottom of said base pot defines a drain hole therein;
a pole defining a lumen therethrough, the pole including a plurality of perforations, said pole being inserted into the interior space of the base pot and into the drain hole in the base, the lumen and perforations in the pole being in communication with the interior space of the base pot to provide watering access to a plant and soil contained in the base pot;
a first brace being adjustable in length, wherein the first brace is mounted on the pole and is received inside of the interior space of the base pot;
a second brace being adjustable in length, wherein the second brace is mounted on the pole and is received inside of the interior space of the base pot;
wherein said braces each contact the side wall of the base pot to stabilize the plant stand; and
a plurality of pots each having a side wall, a bottom and a hole in said bottom, and wherein the pole projects through the bottom hole in each of the pots;
wherein each of the pots is supported on an upper rim of the pot immediately subjacent thereto and the pots are positioned in an alternating configuration about the pole;
wherein the pot immediately superjacent to the base pot is supported on one of the braces in the interior space of the base pot and a side wall of the immediately superjacent pot is stabilized by the upper rim of the base pot.

11. The plant stand of claim 10, wherein said first brace and said second brace are positioned orthogonal to and spaced from one another when received inside the interior space of the base pot.

12. The plant stand of claim 10 wherein the each brace further comprises:
at least one extension adjustably coupled to a longitudinal end of a brace member.

13. The plant stand of claim 12 wherein the extension is telescopically coupled to the brace member.

14. The plant stand of claim 13 further comprising:
a button on one of the brace member and the extension; and
a plurality of sockets on the other one of the brace member and the extension;
wherein the button is selectively received in one of the sockets to adjustably couple the extension to the brace member.

15. The plant stand of claim 10 wherein the pole is positioned equal distances from each longitudinal end of each brace.

16. A kit for erecting a plant stand arrangement with a base pot and at least one upper pot each having a bottom and a side wall, the kit comprising:
a pole adapted to be inserted into the base pot and extending generally vertically upwardly; and
first and second braces each adapted to be mounted to the pole in spaced relation to each other and in contact with an interior surface of the base pot, at least one of the braces being adjustable in length;
wherein one of the braces is adapted to support the bottom of the upper pot and an upper rim of the base pot stabilizes the side wall of the upper pot when the upper pot is mounted on the pole.

17. The kit of claim 16 further comprising:
a first and second aperture in the first and second braces, respectively, each aperture being adapted to receive the pole there through.

18. The kit of claim 16 further comprising:
a longitudinal lumen in the pole; and
a plurality of perforations in the pole, each perforation being in communication with the lumen to disperse fluid in the lumen into the pots when positioned on the pole.

19. The kit of claim 16, wherein said first brace and said second brace are positioned orthogonal to and spaced from one another when received inside the base pot.

20. The kit of claim 16 wherein a length of each brace is adjustable.

* * * * *